(12) United States Patent
Nishijima et al.

(10) Patent No.: US 8,957,760 B2
(45) Date of Patent: Feb. 17, 2015

(54) ELECTRIC VEHICLE THEFT PREVENTING DEVICE

(75) Inventors: Toshifumi Nishijima, Kasugai (JP); Toshiro Hikita, Tama (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 23 days.

(21) Appl. No.: 13/704,167

(22) PCT Filed: Jun. 30, 2011

(86) PCT No.: PCT/IB2011/001933
§ 371 (c)(1),
(2), (4) Date: Dec. 13, 2012

(87) PCT Pub. No.: WO2012/020306
PCT Pub. Date: Feb. 16, 2012

(65) Prior Publication Data
US 2013/0091907 A1     Apr. 18, 2013

(30) Foreign Application Priority Data

Jun. 30, 2010 (JP) .................................. 2010-149615

(51) Int. Cl.
| | | |
|---|---|---|
| G05B 19/00 | (2006.01) | |
| H01H 27/00 | (2006.01) | |
| B60R 25/24 | (2013.01) | |
| B60L 11/14 | (2006.01) | |
| B60L 11/18 | (2006.01) | |

(52) U.S. Cl.
CPC ............... *B60R 25/24* (2013.01); *B60L 11/14* (2013.01); *B60L 11/1816* (2013.01); *B60L 11/1838* (2013.01); *B60L 11/1846* (2013.01); *B60L 2270/36* (2013.01); *Y02T 10/7005* (2013.01); *Y02T 10/7077* (2013.01); *Y02T 10/7088* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y04S 30/14* (2013.01)
USPC ........................................ 340/5.65; 307/10.4

(58) Field of Classification Search
USPC ......... 701/22, 36; 340/5.65, 901, 538; 70/237
See application file for complete search history.

(56) References Cited

U.S. PATENT DOCUMENTS

| | | | | | |
|---|---|---|---|---|---|
| 4,965,738 | A | * | 10/1990 | Bauer et al. ...................... | 320/136 |
| 5,757,595 | A | * | 5/1998 | Ozawa et al. .................... | 340/636.1 |
| 7,181,409 | B1 | * | 2/2007 | Murakami et al. ............... | 705/5 |
| 8,106,630 | B2 | * | 1/2012 | Tupman et al. .................. | 320/132 |
| 8,321,081 | B2 | * | 11/2012 | Nakamura ........................ | 701/22 |

(Continued)

FOREIGN PATENT DOCUMENTS

| | | |
|---|---|---|
| EP | 2 108 538 A1 | 10/2009 |
| JP | A-2005-231439 | 9/2005 |

(Continued)

*Primary Examiner* — Van T. Trieu
*Assistant Examiner* — Royit Yu
(74) *Attorney, Agent, or Firm* — Oliff PLC

(57) ABSTRACT

In a vehicle theft preventing device that is used in a chargeable vehicle, a prohibition request signal, that requests the prohibition of execution of vehicle function is transmitted from a terminal to the vehicle when power is received by the vehicle. The vehicle theft preventing device disallows authentication using a key when the prohibition request signal is received from the terminal. The authentication using the key is disallowed unless the authentication is enabled by the terminal.

5 Claims, 8 Drawing Sheets

(56) References Cited

U.S. PATENT DOCUMENTS

| | | |
|---|---|---|
| 2002/0059532 A1* | 5/2002 | Ata et al. .................... 713/202 |
| 2005/0179320 A1 | 8/2005 | Shimomura |
| 2006/0049962 A1* | 3/2006 | Okada ......................... 340/901 |
| 2007/0222293 A1* | 9/2007 | Shimomura ................ 307/10.3 |
| 2009/0043450 A1* | 2/2009 | Tonegawa et al. ............. 701/36 |
| 2009/0085522 A1* | 4/2009 | Matsumoto ................... 320/137 |
| 2010/0063675 A1* | 3/2010 | Soma et al. .................... 701/36 |
| 2010/0194529 A1* | 8/2010 | Yamamoto .................. 340/5.65 |
| 2011/0048826 A1* | 3/2011 | Starr ......................... 180/65.51 |

FOREIGN PATENT DOCUMENTS

| | | |
|---|---|---|
| JP | A-2007-334586 | 12/2007 |
| JP | A-2009-171642 | 7/2009 |
| JP | A-2010-22164 | 1/2010 |
| JP | A-2010-104209 | 5/2010 |

* cited by examiner

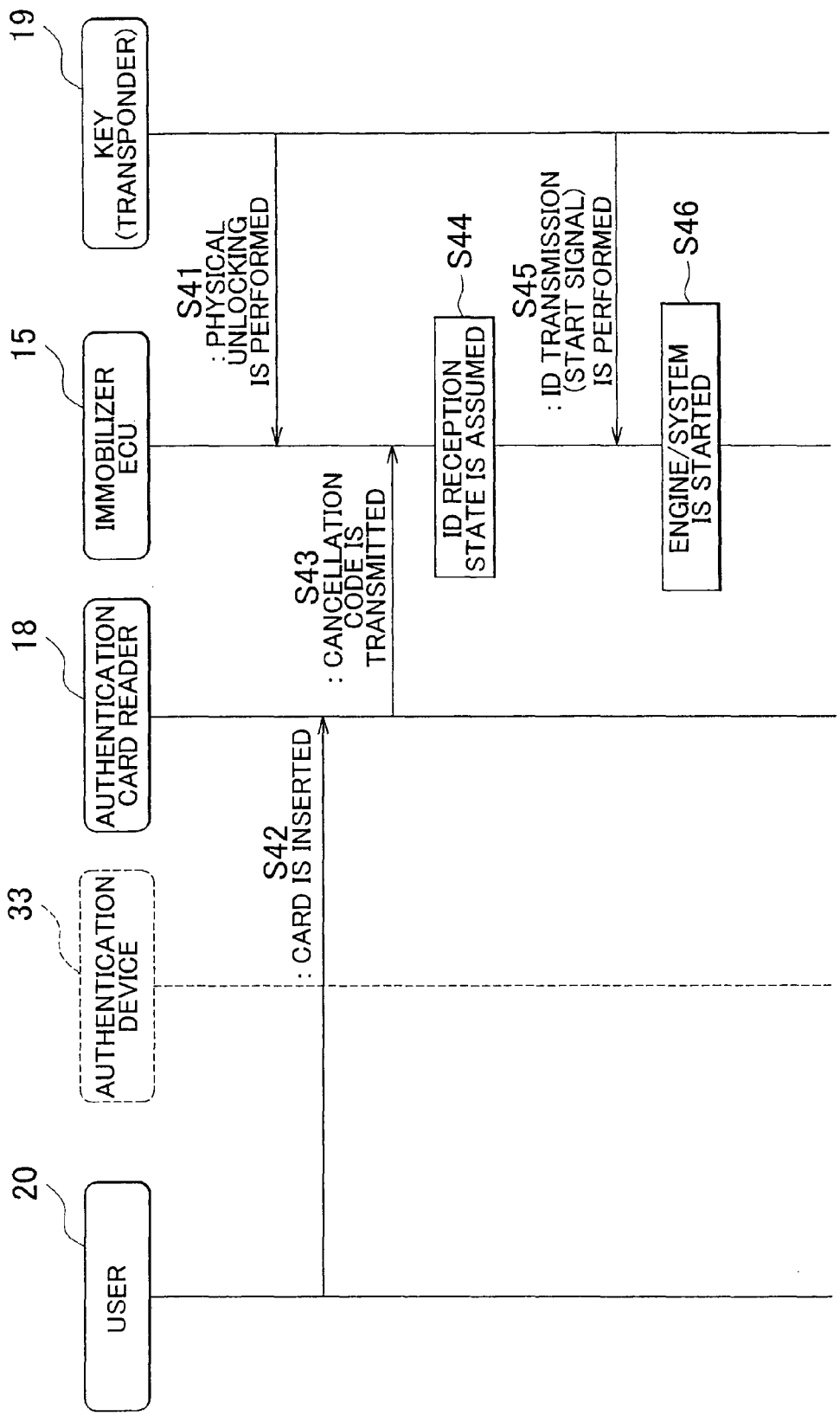

ELECTRIC VEHICLE THEFT PREVENTING DEVICE

BACKGROUND OF THE INVENTION

1. Field of the Invention

The invention relates to a vehicle theft preventing device.

2. Description of Related Art

Vehicles that can be charged, for example, from a household power source are presently available. In such vehicles, charging of the onboard battery is conducted via a charging cable connected to a outlet. In the power supply control device described in Japanese Patent Application Publication No. 2009-171642 (JP-A-2009-171642), an authentication operation is conducted between the home and the vehicle by power line communication (PLC communication) via a charging cable, charging is performed when authentication is established. When the authentication fails, on the other hand, an immobilizer to disable the running of the vehicle is actuated, as a result of which the engine cannot be started.

However, with the technique described in JP-A-2009-171642, when the authentication is established, charging is started and during charging a state is assumed in which the engine can be started. Therefore, it is still possible that the vehicle will be stolen by using the stolen or duplicated key.

SUMMARY OF THE INVENTION

The invention provides a vehicle theft preventing device that can prevent vehicle theft for which a stolen or duplicated key is used.

The vehicle theft preventing device according to one embodiment of the invention is a vehicle theft preventing device that is used in a vehicle chargeable by supplied power, including: a terminal that transmits a prohibition request signal that requires prohibition of execution of a predetermined function of the vehicle when the vehicle is charged; and a vehicle-side control unit that prohibits execution of the predetermined function of the vehicle and disallows authentication using a key upon receiving the prohibition request signal.

Such a vehicle theft preventing device is provided with a terminal transmitting a prohibition request signal (immobilizer request signal) that requires prohibition of execution of the predetermined function of the vehicle when the vehicle is charged. Therefore, the immobilizer request signal can be transmitted from the terminal to the vehicle when the vehicle is charged. Further, after the immobilizer request signal transmitted from the terminal has been received, authentication using the key is disabled and the execution of the vehicle function is prohibited. Authentication using the key can thus be disallowed unless the authentication is enabled by the terminal. As a result, by prohibiting the authentication using the key during charging makes it possible to the prevent the vehicle theft performed by using the stolen or duplicated key.

In this case, the predetermined function of the vehicle for which execution is prohibited in response to the prohibition request signal is at least one of a function of unlocking a door lock of the vehicle and a function of starting a drive source of the vehicle. Where these vehicle functions are prohibited, a state is assumed in which the vehicle cannot run and therefore the vehicle theft can be prevented. By preventing the door lock from being unlocked when the authentication has not been established, it is possible to reduce the probability of an outsider intruding into the vehicle. Further, where it is made impossible to start the engine or activate the system that starts the drive source such as an electric motor, a state is assumed in which the vehicle cannot run and therefore the vehicle theft can be prevented.

In the vehicle theft preventing device, the power may be supplied to the vehicle by using a power line. The vehicle-side control unit may allow the execution of the vehicle function when authentication using the key is established and may prohibit the execution of the vehicle function when the authentication fails. The terminal may transmit the prohibition request signal via the power line.

The vehicle theft preventing device according to the second embodiment of the invention is a vehicle theft preventing device which is used in a vehicle chargeable by power supplied using a power line and in which a vehicle function can be executed when authentication using a key is established and the vehicle function cannot be executed when the authentication is not established, the vehicle theft preventing device including an indoor terminal that transmits via the power line a prohibition request signal that requires prohibition of execution of the vehicle function and a vehicle-side control unit that disables execution of the vehicle function and disables authentication using the key upon receiving the prohibition request signal.

With the vehicle theft preventing device of the present embodiment, vehicle theft using a stolen or duplicated key can be prevented.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 8 is a sequence diagram illustrating the case in which the authentication device installed in the house has failed and personal authentication is performed by using an authentication card.

DETAILED DESCRIPTION OF EMBODIMENTS

Figure 1:
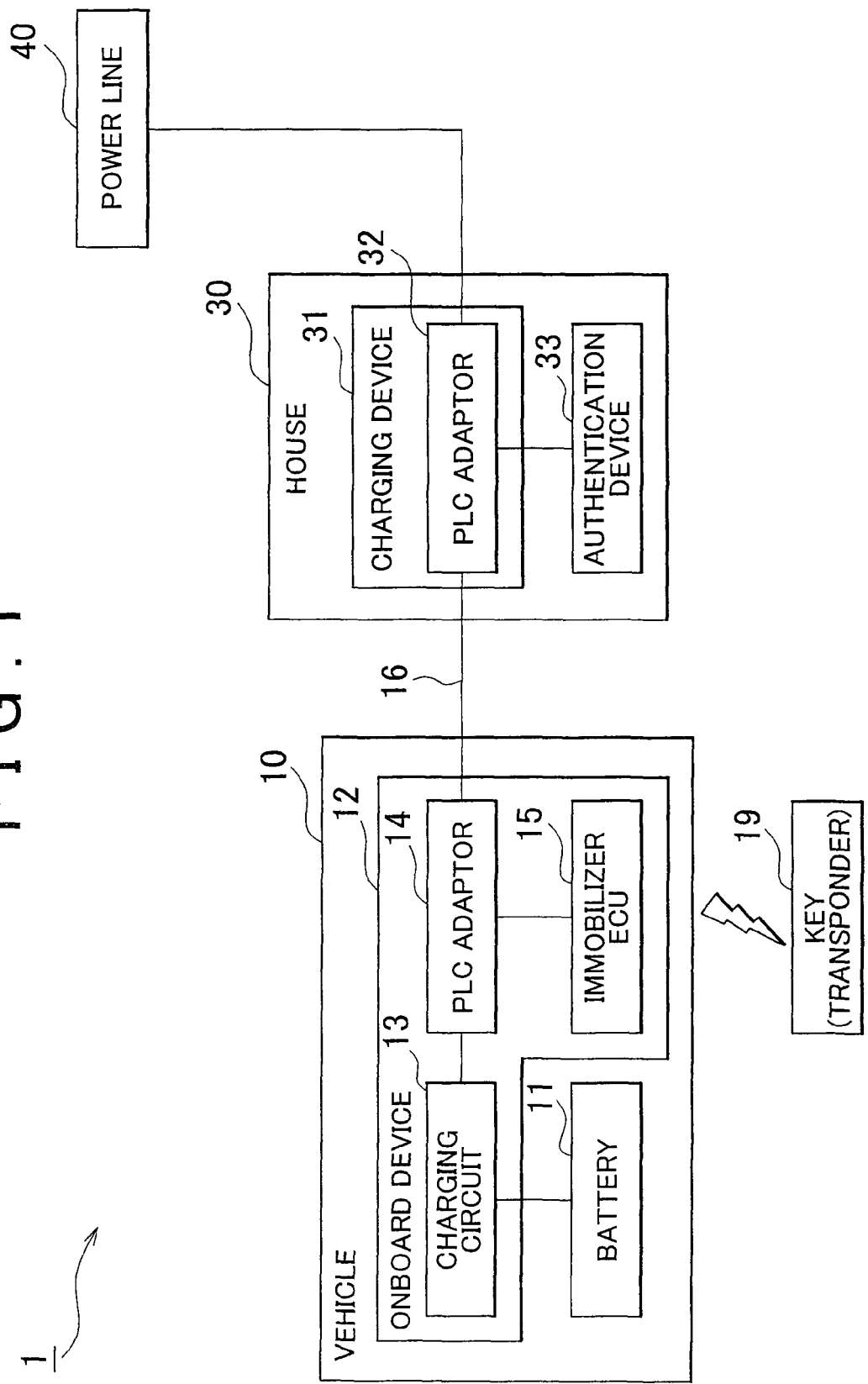
FIG. 1 is a block configuration diagram of the charging system equipped with the vehicle theft preventing device according to the first embodiment of the invention.

The preferred embodiment of the vehicle theft preventing device according to the invention will be explained below. In the explanation of figures, identical or corresponding elements are assigned with identical reference numerals and redundant explanation thereof is omitted. In the present embodiment, the application of the vehicle theft preventing device to the charging system will be explained.

A vehicle theft preventing device 1 according to the first embodiment of the invention is shown in FIG. 1. A charging system to which the vehicle theft preventing device 1 is applied serves to charge a vehicle 10 such as a plug-in hybrid vehicle or an electric automobile from the outside. The vehicle 10 using the charging system carries an immobilizer system that protects the vehicle from theft by disabling the execution of some functions of the vehicle. With the charging system, the vehicle 10 is charged by using a household power source of a house 30 which is a typical residential house.

The vehicle 10 is provided with a battery (secondary battery) 11 for charging the power. The vehicle 10 is provided with an onboard device 12 functioning as a terminal device installed on the vehicle. This onboard device 12 can be electrically connected to the battery 11 and a charging cable 16. The onboard device 12 is also provided with a charging circuit 13 that controls charging of the battery 11, a PLC adaptor 14 that can perform PLC communication via the charging cable 16, and an immobilizer ECU 15 that controls the immobilizer system.

The charging circuit 13 detects, for example, the residual capacity of the battery 11 and controls the charging start and end. The PLC adaptor 14 is a commonly used communication interface and can communicate with a charging device (authentication device) disposed inside the house 30. The PLC adaptor 14 functions as vehicle-side reception means for receiving a prohibition request signal requesting that the execution of vehicle functions be prohibited.

The immobilizer ECU 15 can verify a key 19 incorporating a transponder where an ID code has been written to control the engine start device. In the immobilizer system, the engine can be started by electronically comparing the ID code written in the transponder and the ID code on the vehicle and determining that authentication using the key 19 is established when the ID codes match. Where the ID codes do not match, it is determined that the authentication has failed and engine start is prohibited.

A charging device 31 that supplies power to the vehicle 10 is disposed in the house 30. The charging device 31 uses, for example, a household outlet and supplies power via a power line 40. When the vehicle 10 is charged, the charging cable (power line) 16 electrically connected to the vehicle 10 is inserted into the outlet of the charging device 31, thereby connecting the vehicle 10 to the charging device 31. In the first embodiment, the charging device 31 is disposed in a typical residential house, but the charging device 31 may be also installed in a building such as an office or a store. The charging device 31 may be also disposed in a special building that can be, for example, locked or provided with means for making it difficult for outsiders to enter the house.

The power supplied to the charging device 31 may be supplied from a power company or may be supplied by generation at home that uses another power generator. For example, power generated by using natural energy such as solar power or power generated by using a fuel cell may be also supplied to the charging device 31. The authentication device 33 installed in the house is preferably equipped with means for prohibiting the operation thereof by other people.

The charging device 31 is provided with the PLC adaptor 32 that can perform PLC communication via the charging cable 16. The PLC adaptor 32 has a function of transmitting the immobilizer request signal to the vehicle 10. The charging device 31 can transmit the immobilizer request signal that instructs to prohibit the execution of vehicle functions when the authentication fails. The PLC adaptor 32 functions as transmission means for transmitting the prohibition request signal (immobilizer request signal) that requests the prohibition of execution of vehicle functions when the vehicle is charged. The transmission of the prohibition request signal when the vehicle is charged may be the transmission of the prohibition request signal performed immediately before charging of the vehicle is started, the transmission of the prohibition request signal performed simultaneously with the vehicle charging process, and the transmission of the prohibition request signal performed immediately after the charging is started. Essentially, the adaptor may be configured to transmit a command signal for disabling the execution of predetermined functions (for example, engine start, door lock release, etc.) when the vehicle is charged.

An authentication device 33 that controls enabling/disabling of authentication using the key 19 is connected to the charging device 31. The authentication device 33 controls the immobilizer system in the vehicle 10. The authentication device 33 transmits a cancellation code for canceling the prohibition of execution of vehicle functions to the immobilizer ECU 15 of the vehicle 10. The authentication device 33 generates authentication data and transmits the generated data to the immobilizer ECU 15 of the vehicle 10.

Operation means that is operated by an operator is also connected to the charging device 31. Examples of the operation means include a button, a keyboard, and a touch panel. When the operation of the vehicle 10 is started, the operator performs an operation input by using the operation means, thereby starting the immobilizer system of the vehicle 10 and canceling the prohibited vehicle function.

The charging device 31 is constituted by a CPU that performs computational processing, ROM and RAM serving as storage units, an input signal circuit, an output signal circuit, and a power source circuit. The charging device 31 functions as a (indoor) terminal transmitting a prohibition request signal that requires the prohibition of execution of vehicle functions when the vehicle is charged. The charging device 31 has a function of controlling the power supplied to the vehicle. The terminal may be a terminal at a facility that supplies the power or may be a terminal that receives information outputted from the power supplying facility. The terminal is not limited to the indoor terminal and may be an outdoor terminal. For example, a terminal provided within a managed location with restricted access of other people is preferred.

Figure 2:
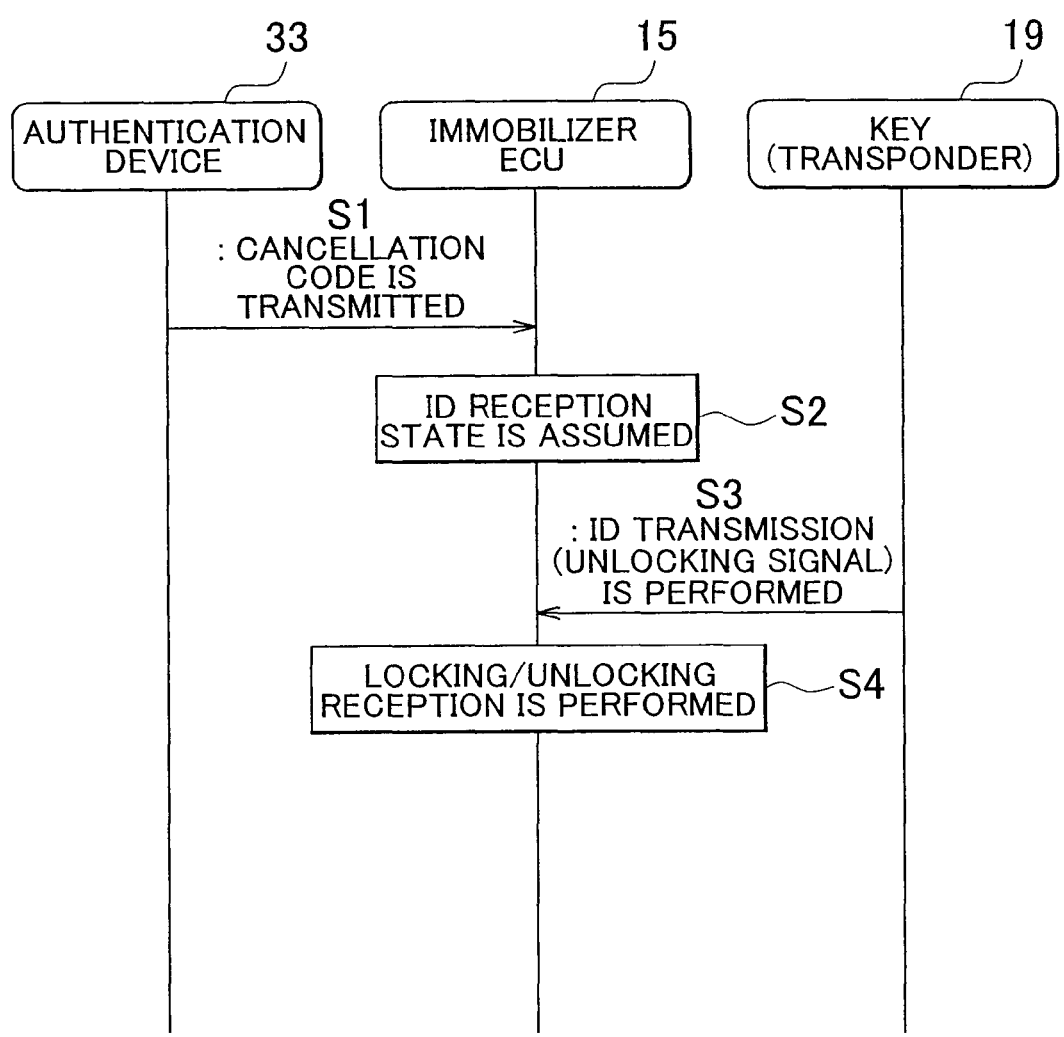
FIG. 2 is a sequence diagram illustrating the processing flow in the case in which the vehicle is to be driven out of the house.

The operation of the vehicle theft preventing device 1 according to the present embodiment will be explained below. The authentication processing performed when the vehicle is to be driven out of the house will be explained below with reference to FIG. 2. FIG. 2 is a sequence diagram illustrating the flow of processing performed when the vehicle is to be driven out of the house. First, where a button that is operated before the operation of the vehicle 10 is started is pushed in the authentication device 33 in the house (own residence) 30, the authentication device 33 transmits a cancellation code to the immobilizer ECU 15 (step S1). The cancellation code transmitted from the authentication device 33 reaches the immobilizer ECU 15 via the PLC adaptor 32 located in the house, the charging cable 16, and the PLC adaptor 14 of the vehicle 10.

In the vehicle 10, before the cancellation code transmitted from the authentication device 33 is received, the unlocking (lock opening) with the key 19 is impossible. In step S2, the immobilizer ECU 15 receives the cancellation code transmitted from the authentication device 33 and an ID reception state is assumed. Thus, where the PLC adaptor 14 receives the cancellation code, the immobilizer ECU 15 allows the authentication using the key 19.

Where an ID signal requesting that the vehicle 10 be unlocked is transmitted from the key 19 in step S3, the immobilizer ECU 15 receives the ID signal. The immobilizer ECU 15 then receives the authentication of the authentication device 33 inside the house and unlocks the door locks of the vehicle 10. Alternatively, the immobilizer ECU 15 enables an unlocking reception state in which the door locks of the vehicle 10 can be unlocked.

Figure 3:
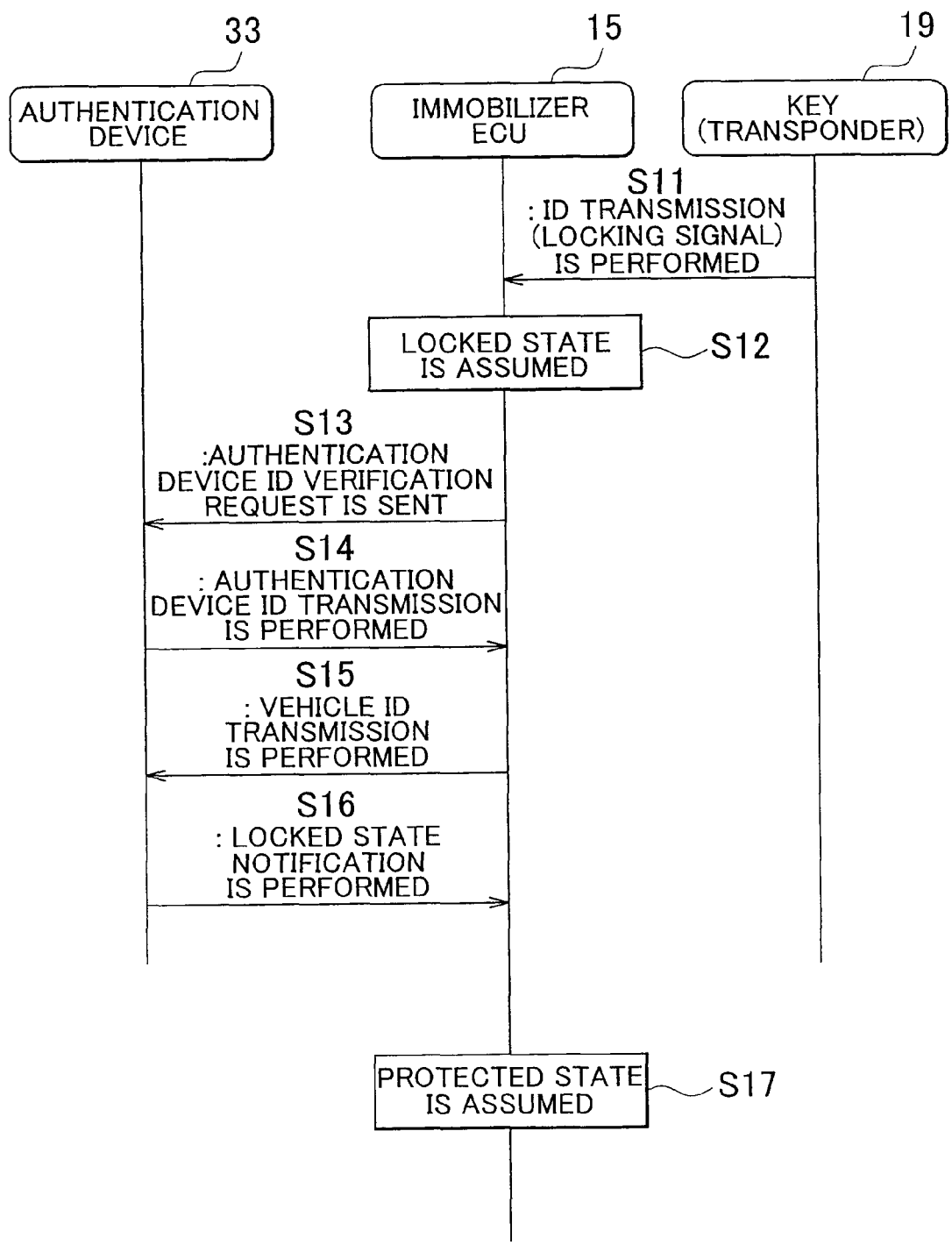
FIG. 3 is a sequence diagram illustrating the processing flow in the case in which the vehicle arrives at the house.

The authentication processing performed when the vehicle arrives at the house 30 will be explained below with reference to FIG. 3. FIG. 3 is a sequence diagram illustrating the case in which the vehicle arrives at the house. Where the vehicle 10 arrives at the house 30, which is the driver's residence, the vehicle is stopped in a predetermined parking space. After the vehicle has been stopped, the driver stops the engine (drive source).

First, the key 19 transmits the ID signal (locking signal). The immobilizer ECU 15 receives the ID signal, closes to door locks of the vehicle 10, and enables the locked state. Then, the immobilizer ECU 15 requests ID confirmation provided by the authentication device 33 located in the house (step S13).

Where the authentication device 33 receives a request signal from the immobilizer ECU 15, the ID signal of the authentication device 33 is returned to the immobilizer ECU 15 (step S14).

Where the immobilizer ECU 15 then receives an ID signal for identifying the authentication device 33, an ID signal for identifying the vehicle 10 is transmitted to the authentication device 33. A plurality of vehicles can thus be recognized by the authentication device 33.

Where the authentication device 33 then receives the ID signal for identifying the vehicle 10, the authentication device transmits to the immobilizer ECU 15 a command signal for instructing the immobilizer ECU 15 to set the vehicle 10 into the locked state.

Upon receiving the command signal (immobilizer request signal) that requires the locked state, the immobilizer ECU 15 stops the vehicle functions of the vehicle 10. A state in which the authentication with the immobilizer ECU 15 is disallowed is also assumed. In other words, the authentication using the key is disabled by the immobilizer.

Figure 4:
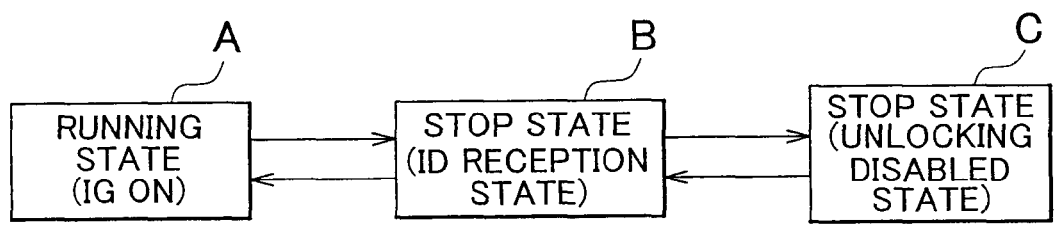
FIG. 4 illustrates variations in the state of the vehicle using the authentication device according to the present embodiment.

Each state of the vehicle that uses the vehicle theft preventing device 1 will be explained below with reference to FIG. 4. FIG. 4 shows the variation of state of the vehicle using the authentication device of the present embodiment. As shown in FIG. 4, when the ignition (IG) is ON, the vehicle assumes a state in which the vehicle 10 can run (state A). The vehicle is then stopped, an operation is performed with the key 19 (or a smart key or an electronic key), the doors are locked, and a stop state is assumed (step B). The charging cable 16 is then connected to the vehicle 10, PLC communication is enabled, and operation with the indoor authentication device 33 is performed. As a result of the operation of the indoor authentication device 33, a stop state is assumed in which the authentication is not executed (step C). Within this period, the charging device 31 is actuated and the battery 11 of the vehicle 10 is charged.

Where the charging is completed and the vehicle 10 is to be started, an operation of the indoor authentication device 33 is performed from the stop state (state C) in which the authentication is not executed, an ID reception state (state B) is assumed, and a state is assumed in which the authentication can be executed. An operation with the key 19 (or a smart key) is performed from the ID reception state (state B), and where the authentication is established, the door locking is canceled, and a state is assumed in which the vehicle 10 can run (state A).

The case in which the PLC communication between the indoor authentication device 33 and the vehicle 10 is cut off will be explained below with reference to FIG. 3. An all-time encrypted communication is performed between the authentication device 33 and the immobilizer ECU 15 of the vehicle 10. More specifically, the all-time encrypted communication is performed by sequentially repeating the ID confirmation request of the authentication device 33 (step S13), ID transmission of the authentication device 33 (step S14), ID transmission of the vehicle 10 (step S15), and lock state notification (step S16).

The communication of steps S13 to S16 is performed at all times (that is, the communication is performed with a high frequency). When the communication is interrupted (the communication is impossible for n seconds or the connection link of the charging cable 16 is disconnected), the immobilizer ECU 15 remains locked and the actuation is impossible. Even in this case, physical unlocking by a physical key, which is not an electronic key, is possible (however, in this state the engine cannot be started by the immobilizer ECU 15).

With the vehicle theft preventing device 1 of the present embodiment, the authentication device (terminal) operated by the operator is disposed indoors and the prohibition request signal (immobilizer request signal) that requests the prohibition of execution of vehicle functions is transmitted from the indoor authentication device 33 to the vehicle by PLC communication. When the vehicle theft preventing device 1 receives the immobilizer request signal from the indoor authentication device 33, authentication using the key is impossible, that is, prohibited. Therefore, authentication using the key 19 can be disallowed, that is, prohibited unless the authentication is enabled by the indoor authentication device. As a result, the vehicle theft performed by using the key 19 or the key duplicate can be prevented. Intrusion of outsiders is made difficult and the possibility of vehicle theft can be greatly reduced.

In this case, the vehicle function for which the execution is prohibited in response to the prohibition request signal is a function of unlocking the door locks of the vehicle. Therefore, when the authentication is disabled by the indoor authentication device 33, even the authentication using the key 19 is impossible. For this reason, the door locks are difficult to unlock and the probability of vehicle theft is greatly reduced. Setting the engine start device into the execution disabled state may be also a vehicle function for which the execution is prohibited in response to the prohibition request signal. In this case, even if the doors are unlocked, the engine cannot be started and therefore the vehicle cannot be stolen. Other functions can be also used as the vehicle function for which the execution is prohibited in response to the prohibition request signal, and the functions that make it impossible to run the vehicle are preferred.

Figure 5:
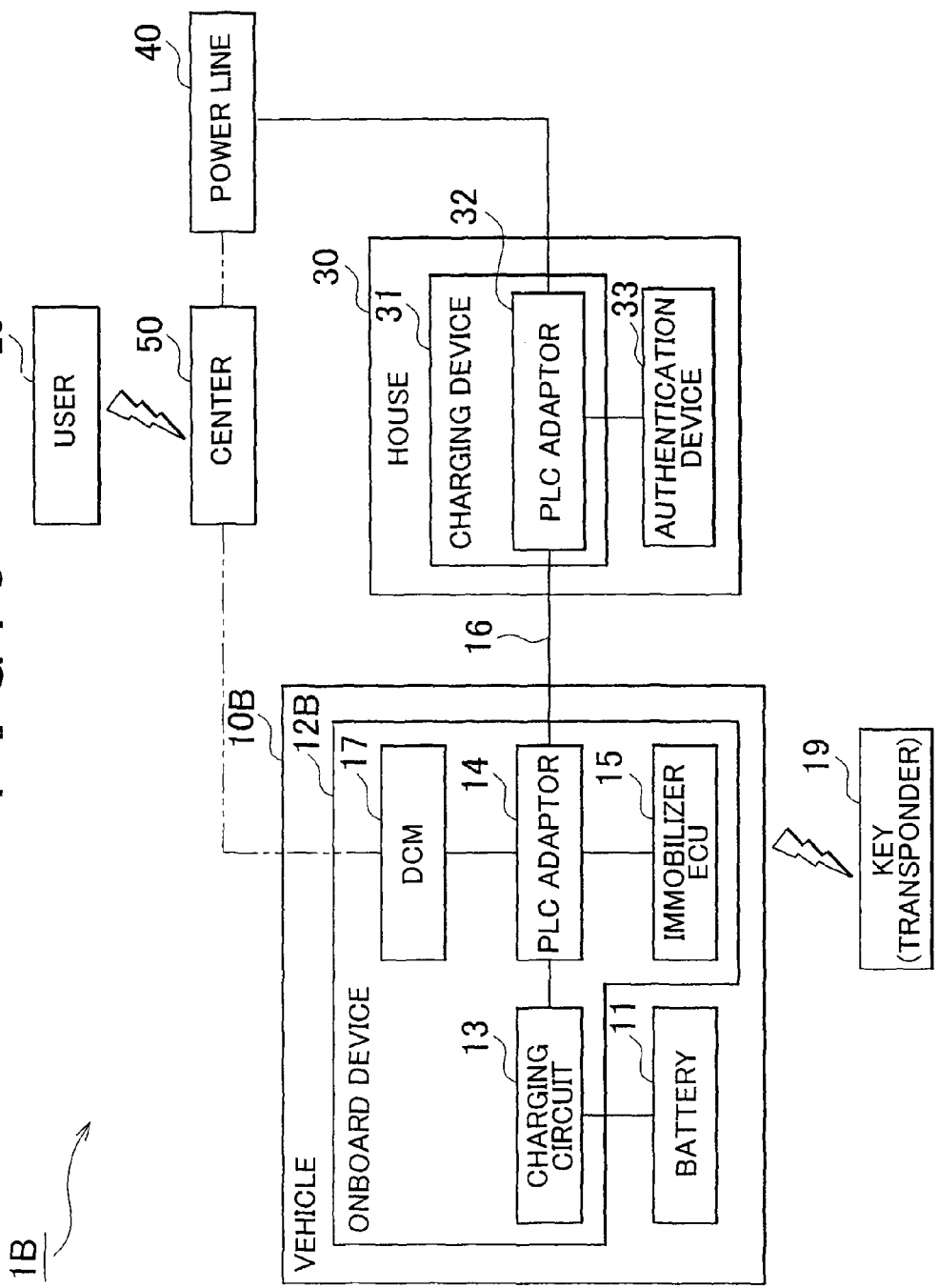
FIG. 5 is a block configuration diagram of the charging system equipped with the vehicle theft preventing device according to the second embodiment of the invention.

FIG. 5 is a block configuration diagram of the charging system including the vehicle theft preventing device according to the second embodiment of the invention. When the indoor authentication device 33 fails, cancellation of the vehicle function that has been made impossible to execute by the immobilizer system cannot be performed. When a system in which the authentication is executed by using an IC card or the like is employed against the failure of the authentication device 33, this system can become a backdoor for the theft and therefore should be carefully studied for use as the cancellation method. The vehicle theft preventing device 1B according to the second embodiment is different from that of the abovementioned first embodiment in that measures are taken to handle the failure of the indoor authentication device 33. The explanation of features identical to those of the first embodiment is herein omitted.

A vehicle 10B using the vehicle theft preventing device 1B according to the second embodiment is provided with an onboard device 12B functioning as a terminal device carried on the vehicle. The onboard device 12B is different from the onboard device 12 according to the first embodiment in that a Data Communication Module (DCM) 17 is included that can be connected to a network.

The DCM 17 functions as wireless communication means and can communicate with the center 50 that performs identity verification. Further, the DCM 17 is electrically connected to the immobilizer ECU 15.

The charging device 31 and the authentication device 33 disposed in the house 30 are configured similarly to the devices according to the first embodiment. The indoor communication device 33 can be connected to the center 50 by using PLC communication.

Figure 6:
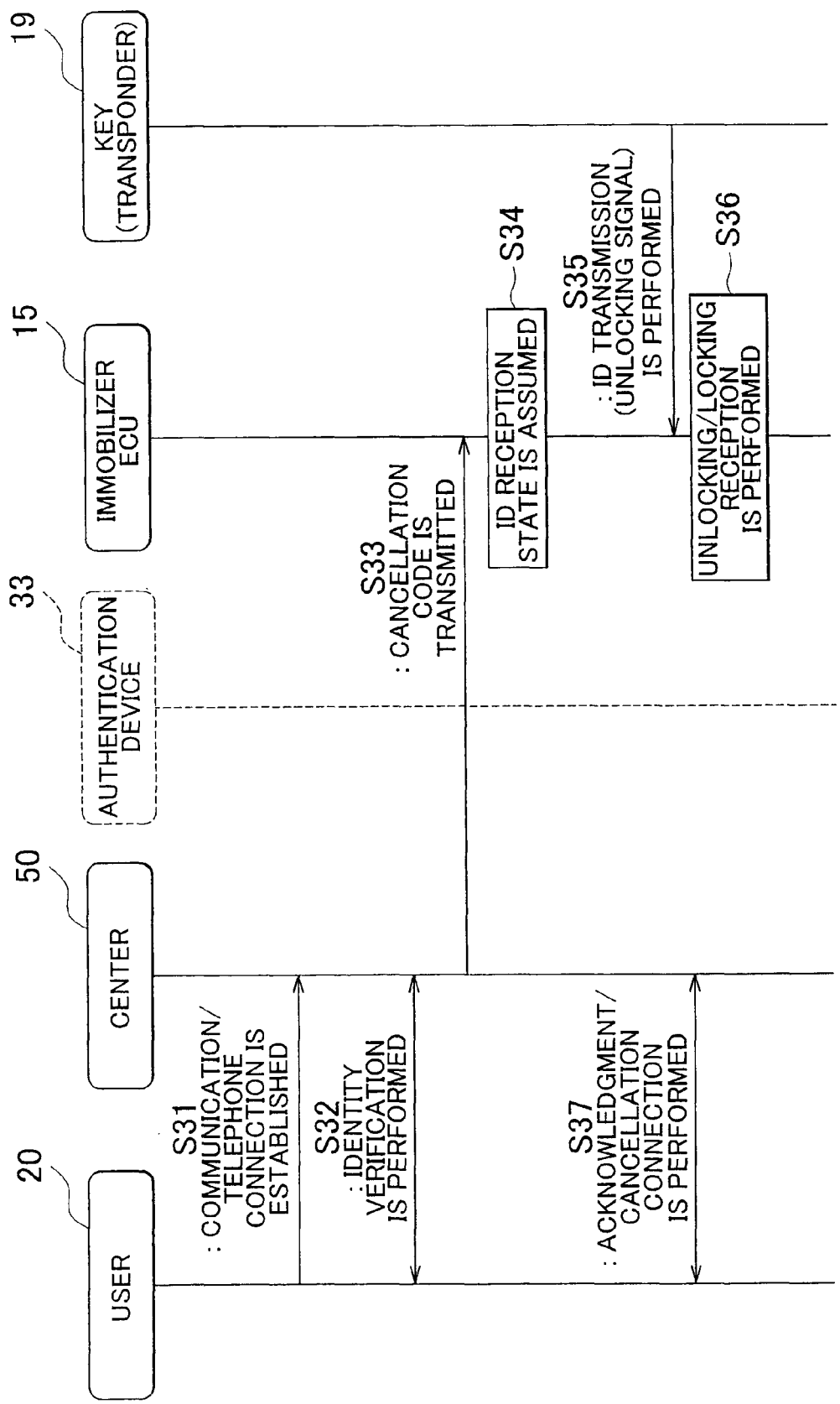
FIG. 6 is a sequence diagram illustrating the processing flow in the case in which the authentication device installed in the house has failed and identity verification is performed in the center.

The operation of the vehicle theft preventing device 1B according to the present embodiment is explained below. FIG. 6 is a sequence diagram relating to the case in which identity verification is performed by the center 50 when the indoor authentication device 33 fails. When the indoor authentication device 33 fails, a user 20 performs communication connection to the center 50 (step S31). The user 20 communicates by voice or electronically with the center 50 by using, for example, communication means such as telephone or internet.

Then, identity verification is performed between the user 20 and the center 50 (step S32). After identity verification has been performed, the center 50 transmits to the immobilizer ECU 15 a cancellation code for canceling the immobilizer (step S33). The immobilizer ECU 15 then receives a cancellation code transmitted from the center 50 and assumes an ID reception state (step S34). Door unlocking with the key 19 is impossible before the cancellation code is transmitted from the center 50 and the ID reception state is assumed.

Where an ID signal that requests unlocking of the vehicle 10 is then transmitted from the key 19 in the subsequent step S35, the immobilizer ECU 15 receives the ID signal. The immobilizer ECU 15 then cancels the immobilizer and unlocks the doors of the vehicle 10. Alternatively, the immobilizer ECU 15 assumes an unlocking reception state in which the doors of the vehicle 10 can be unlocked.

After the cancellation code has been transmitted (step S33), the center 50 communicates that the immobilizer cancellation has been authorized or the immobilizer cancellation has been executed (step S37).

The operation and effect of the vehicle theft preventing device 1B according to the second embodiment are similar to those of the vehicle theft preventing device 1 according to the first embodiment. Further, the configuration according to the second embodiment is such that when the indoor authentication device 33 fails, the cancellation of the immobilizer can be performed only after conducting identity verification via the center 50. The user 20 communicates with the center 50 via telephone or internet and, after identify verification has been performed by the center 50, the vehicle 10B can be started by setting the immobilizer ECU 15 into an ID standby state. Although it is assumed that strict identity verification is performed so as to prevent misrepresentation, even when misrepresentation has occurred, unless it has occurred after authentication with the immobilizer system has been established, the vehicle function for which execution has been disabled cannot be executed and therefore reliability of the vehicle theft preventing device 1B is further increased.

The identity verification can be performed by a method using information stored in the center 50 (information at the time of registration) or personal DB information, or an individual information device storing individual information, such as an IC card or a cellular phone.

Figure 7:
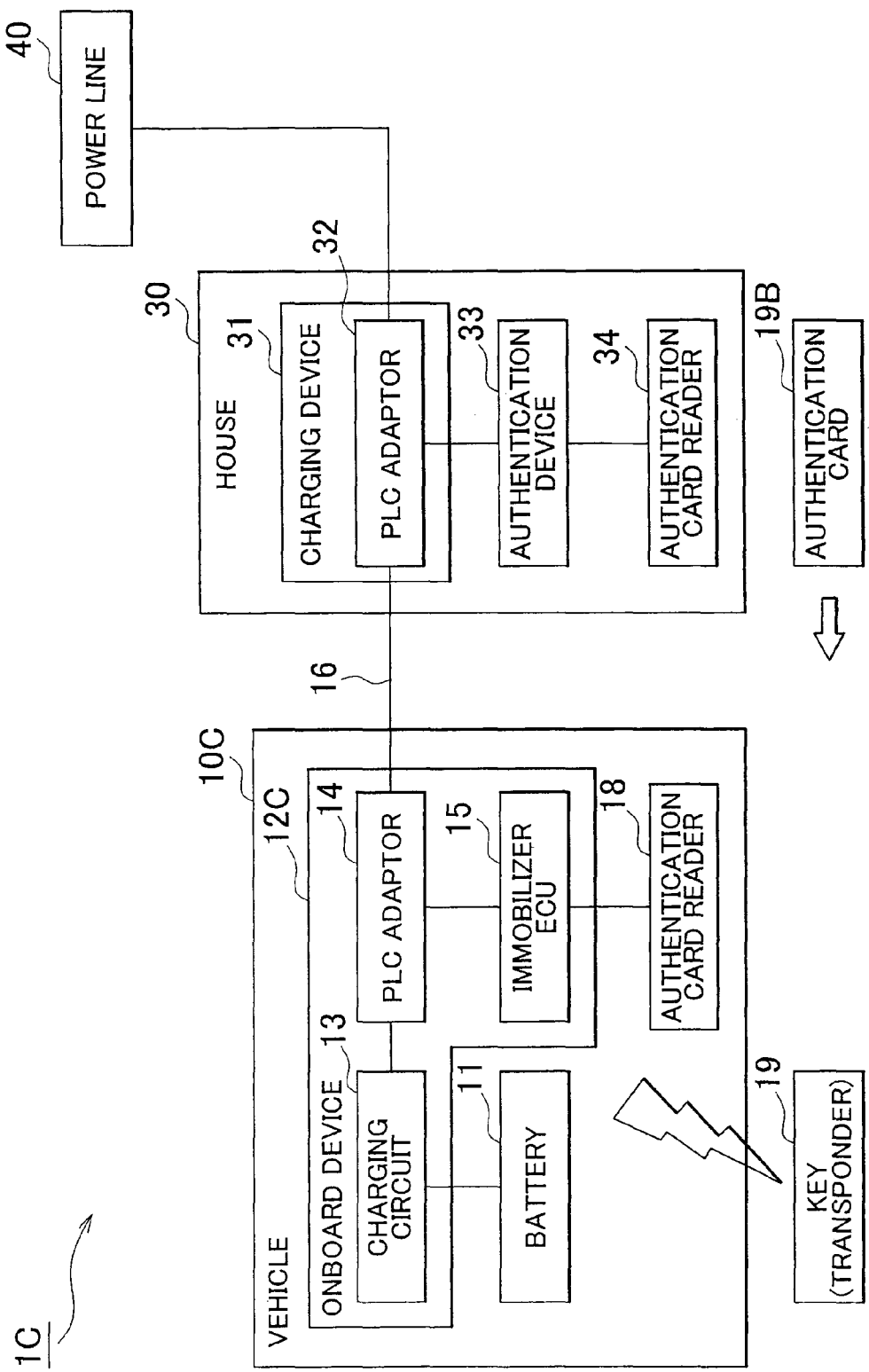
FIG. 7 is a block configuration diagram of the charging system according to the third embodiment of the invention.

FIG. 7 is a block configuration diagram of the charging system equipped with a vehicle theft preventing device 1C according to the third embodiment of the invention. The vehicle theft preventing device 1C according to the third embodiment of the invention is different from the vehicle theft preventing device according to the first embodiment in that authentication using an authentication card 19B can be used as a measure to be taken when the indoor authentication device 33 fails. The explanation of features similar to those of the first embodiment will be omitted.

A vehicle 10C using the vehicle theft preventing device 1C according to the third embodiment is provided with an onboard device 12C functioning as a terminal device installed on the vehicle. This onboard device 12C is different from the onboard device 12 according to the first embodiment in that an authentication card reader 18 is connected and authentication information (ID information) stored in the authentication card 19B can be read.

Likewise, the indoor authentication device 33 is different from the authentication device 33 according to the first embodiment in that an authentication card reader 34 is connected and authentication information stored in the authentication card 19B can be written.

The authentication device 33 can write authentication information into the authentication card 19B inserted into the authentication card reader 34. The authentication device 33 itself saves the authentication information in advance in the authentication card 19B. In addition to an IC card, a hardware authentication device or recording medium equipped with a protection function that has stored therein information relating to the authentication key may be used as the authentication card. The authentication card readers 18, 34 function as authentication information reading devices.

The operation of the vehicle theft preventing device 1C according to the present embodiment will be explained below. FIG. 8 is a sequence diagram illustrating the case in which the indoor authentication device has failed and identity verification is performed with an authentication card. When the indoor authentication device 33 has failed, the user 20 physically unlocks the vehicle by inserting the key 19 into the key hole of the vehicle 10C (step S41).

The user 20 then inserts the authentication card 19B into the authentication card reader 18 located inside the vehicle (step S42). The authentication card reader 18 reads the authentication information stored in the authentication card 19B and, where the authentication is established, transmits a cancellation code for canceling the immobilizer to the immobilizer ECU 15 (step S43). The immobilizer ECU 15 then receives the cancellation code transmitted from the authentication card reader 18 and an ID reception state is assumed (step S44). Before the cancellation code is transmitted from the authentication card reader 18 and the ID reception state is assumed, the engine cannot be started.

The ID signal (start signal) stored in the transponder of the key 19 is then transmitted to the immobilizer ECU 15 (step S45). Where the ID signal transmitted from the key 19 is received by the immobilizer ECU 15, a state is assumed in which the engine can be started (step S46). Alternatively, a state is assumed in which the system controlling the running of the vehicle can be started.

The operation and effect demonstrated by the vehicle theft preventing device 1C according to the third embodiment are similar to those of the vehicle theft preventing device 1 according to the first embodiment. Further, when the indoor authentication device 33 fails, cancellation of the immobilizer is impossible until after the vehicle is physically unlocked using the key 19, the authentication card 19B is inserted into the onboard authentication card reader 18, and authentication is established. Since the vehicle function for which execution has been disabled cannot be executed until after the authentication with the immobilizer system has been established, the reliability of the vehicle theft preventing device 1C is further increased.

The invention is explained hereinabove in details on the basis of embodiments thereof, but the invention is not limited to the embodiments. For example, the vehicle theft preventing device according to the invention may be also used in a motorcycle driven by an electric motor. In such a case, vehicle theft can be prevented by using a configuration in which the driver source cannot be started or a configuration in which the locked state of the steering wheel cannot be canceled when authentication is not established.

Further, in the above-described embodiments, the prohibition request signal is transmitted by using PLC communication, but communication between the (indoor) terminal and the vehicle-side control unit may be also performed by using another wire communication or wireless communication. Further, in the above-described embodiments, the PLC adaptor 14 and the immobilizer 15 function as the vehicle-side control units.

In the above-described embodiments, the charging device and the vehicle are connected for charging by a cable, but charging may be also performed by using a wireless power supply system in which no cable is used for connection.

The vehicle theft preventing device is preferably configured such that the terminal operated by the operator is disposed indoors and a prohibition request signal (immobilizer request signal) that requires prohibition of execution of vehicle functions be transmitted to the vehicle from the indoor terminal. When the vehicle theft preventing device receives the immobilizer request signal from the indoor terminal, authentication using the key is disabled. The authentication using the key can thus be disallowed unless the authentication is enabled by the indoor terminal. As a result, the vehicle theft performed by using the stolen or duplicated key can be prevented. Intrusion of outsiders is made difficult and the possibility of vehicle theft can be greatly reduced. The terminal functioning as the authentication device performing the authentication, the terminal functioning as the transmission means for transmitting the prohibition request signal, and the terminal functioning as the charging device that controls power supplied to the vehicle may be the same terminal or may be configured by a plurality of mutually communicable terminals.

The invention claimed is:

1. A vehicle theft preventing device of a vehicle, comprising:
   a charging device that transmits a prohibition request signal that requires prohibition of execution of a function of the vehicle when charging of the vehicle is started; and
   a vehicle-side control unit that prohibits execution of the function of the vehicle and disallows authentication using a key response to the prohibition request signal, wherein:
   the vehicle is configured to be chargeable by supplied power from outside the vehicle, the charging device is disposed outside the vehicle and transmits the prohibition request signal to the vehicle-side control unit, and the vehicle-side and control unit is provided inside the vehicle;
   wherein the charging device includes an authentication device that controls authentication using the key, and
   the authentication device transmits the prohibition request signal to the vehicle-side control unit upon receiving an ID signal for identifying the vehicle; and
   wherein the charging device includes the authentication device that transmits a cancellation code for canceling the prohibition of execution of the function of the vehicle; and
   the vehicle-side control units unit allows the authentication using the key upon receiving the cancellation code.

2. The vehicle theft preventing device according to claim 1, wherein
   the function of the vehicle is at least one of a function of unlocking a door lock of the vehicle and a function of starting a drive source of the vehicle.

3. The vehicle theft preventing device according to claim 1, wherein
   the vehicle is chargeable by the power supplied by using a power line,
   the execution of the function of the vehicle is allowed when authentication using the key is established;
   the execution of the function of the vehicle is prohibited when the authentication fails, and
   the charging device transmits the prohibition request signal via the power line.

4. The vehicle theft preventing device according to claim 1, wherein:
   a wireless communication unit that communicates with a center that performs identity verification is electrically connected to the vehicle-side control unit; and
   the vehicle-side control unit allows the authentication using the key when the wireless communication unit receives the cancellation code, transmitted from the center, for canceling the prohibition of execution of the function of the vehicle.

5. The vehicle theft preventing device according to claim 1, wherein:
   the charging device is connected to the authentication device that is connected to an indoor authentication information reading device,
   the authentication device is configured to write authentication information into an authentication card,
   the vehicle-side control unit is connected to vehicle-side authentication information reading device that is provided in the vehicle, and
   the vehicle-side authentication information reading device reads the authentication information stored in the authentication card and transmits the cancellation code for canceling the prohibition of execution of the function of the vehicle when authentication is established by reading the authentication information stored in the authentication card.

* * * * *